(12) United States Patent
Cline (10) Patent No.: US 10,308,155 B1
(45) Date of Patent: Jun. 4, 2019

(54) VERSATILE CUP HOLDER

(71) Applicant: Douglas Cline, Fuquay Varina, NC (US)

(72) Inventor: Douglas Cline, Fuquay Varina, NC (US)

( * ) Notice: Subject to any disclaimer, the term of this patent is extended or adjusted under 35 U.S.C. 154(b) by 0 days.

(21) Appl. No.: 16/047,549

(22) Filed: Jul. 27, 2018

(51) Int. Cl.
*A47K 1/08* (2006.01)
*B60N 3/10* (2006.01)

(52) U.S. Cl.
CPC ............. *B60N 3/102* (2013.01); *B60N 3/107* (2013.01)

(58) Field of Classification Search
CPC ......... B60N 3/102; B60N 3/107; B60N 3/105
USPC .................. 248/231.21, 311.2, 309.4, 206.5; 206/818; 269/8
See application file for complete search history.

(56) References Cited

U.S. PATENT DOCUMENTS

| | | | | |
|---|---|---|---|---|
| 6,305,656 B1* | 10/2001 | Wemyss | ............. | A47G 23/0216 206/5 |
| 2010/0090079 A1* | 4/2010 | Choi | ...................... | B60N 3/106 248/311.2 |
| 2010/0200720 A1* | 8/2010 | Kaemmer | .............. | B60N 3/106 248/311.2 |
| 2014/0263895 A1* | 9/2014 | Dickenson | .......... | B60R 13/0206 248/206.5 |

* cited by examiner

*Primary Examiner* — Todd M Epps
(74) *Attorney, Agent, or Firm* — Coats & Bennett, PLLC (57) ABSTRACT

A cup holder for connecting to a cup and holding the cup. The cup holder comprises a retractable coupling that moves between a retracted position in a housing and an extended position where the coupling projects from the housing. In the extended position, the coupling is configured to attach to a cup or to a receptor associated with the cup.

22 Claims, 10 Drawing Sheets

FIG. 11

VERSATILE CUP HOLDER

FIELD OF THE INVENTION

The present invention relates to cup holders, and more particularly to a universal cup holder that can be employed as a standalone cup holder or can be employed in an existing conventional cup holder cavity.

BACKGROUND OF THE INVENTION

Cup holders are ubiquitous today. They are in vehicles, boats, golf carts, tractors and any number of other moveable or stationary objects. Perhaps most familiar is the cup holder cavity found in automobiles. They include different designs. One design, referred to as a standard design, is sized and shaped to accommodate a limited number of different sizes and shaped cups. Other cup holder cavities incorporate mechanisms that are designed to accommodate various sizes of cups and to engage the cups and hold them in a secure position within the cup holder cavity.

There are many problems and drawbacks with conventional cup holder cavities. First, the standard design without the sizing mechanism has limited utility. It does not accommodate a variety of different sizes and shaped cups. Often users attempt to force larger cups into a standard cup holder cavity. This leads to spills and the possibility of fracturing and/or deforming the cup. Too often cup holder cavities become convenient areas for the accumulation of trash. Moreover, beverages and food are sometimes spilled into the cup holder cavities. This leads to unsanitary conditions in and around the cup holder cavities, as well as being unsightly.

Mechanisms that adjust to the cup size are also problematic, especially in the long term. They are not always easy to use. They are designed with a pre-selected diameter that is sized to fit smaller cups. When larger cups are placed in the cup holder cavity, these mechanisms expand and engage the cup. But this requires using the cup itself as the means to expand the mechanisms. This can lead to spills and again damage to the cup being used. Over a period of time, due to spills, dirt and debris, these mechanisms do not work smoothly. Indeed, they often fail and this can lead to an unusable cup holder cavity.

Therefore, there has been and continues to be a need for a cup holder that overcomes the problems and drawbacks associated with cup holder cavities and the mechanisms employed therein. Furthermore, there is a need for a universal cup holder that can be incorporated into original equipment and which is of a simple, reliable and cost effective design that is clean and neat.

SUMMARY OF THE INVENTION

The present invention relates to a versatile cup holder that can be mounted in an object or adapted to fit a cup holder cavity. In both cases, the cup holder includes a retractable coupling configured to attach to a cup and particularly to a receptor incorporated into the cup or attached to the cup. That is, in one design, the cup includes a receptor that is particularly configured to receive a coupling that forms a part of the cup holder. The coupling is moveably mounted in the cup holder and moveable between a retracted position and an extended position. In the retracted position, the coupling includes a top that is generally flush with a surrounding surface of the cup holder. When extended, the coupling projects from the cup holder and is exposed such that the coupling can be inserted into the receptor associated with the cup. Once inserted into the receptor, the coupling secures the cup and receptor to the cup holder. Now the cup is firmly held in a stationary position.

As noted above, the cup holder's utility extends beyond simply being adaptable to a cup holder cavity. That is, the cup holder of the present invention can be mounted directly in a surface of an object, such as a vehicle, boat, tractor, golf cart, etc. When so mounted, the cup holder is disposed beneath the surface. In a retracted position, the top of the coupling is generally flush with a surrounding surface. Again, when the coupling is extended, it projects outwardly from the surface where it can be inserted into a receptor associated with a cup.

In another embodiment, the cup holder of the present invention is adapted to fit into a conventional cup holder cavity. In this embodiment, the housing of the cup holder is surrounded by a deformable wall that includes a diameter that slightly exceeds the diameter of a standard or selected cup holder cavity. In use, the cup holder having the deformable wall is inserted into the cup holder cavity. In this process, the deformable wall deforms and allows the cup holder to be securely inserted into the cup holder cavity. The deformable wall tends to exert at least a slight force outwardly that securely stations the cup holder in the cup holder cavity where it can be used as described above.

The design of the cup holder can be employed as a mounting or securing device for holding and retaining a wide variety of objects, such as cell phones. Instead of supporting a cup, the basic design discussed herein can be used to secure various objects.

Other objects and advantages of the present invention will become apparent and obvious from a study of the following description and the accompanying drawings which are merely illustrative of such invention.

DESCRIPTION OF EXEMPLARY EMBODIMENTS

Figure 1:
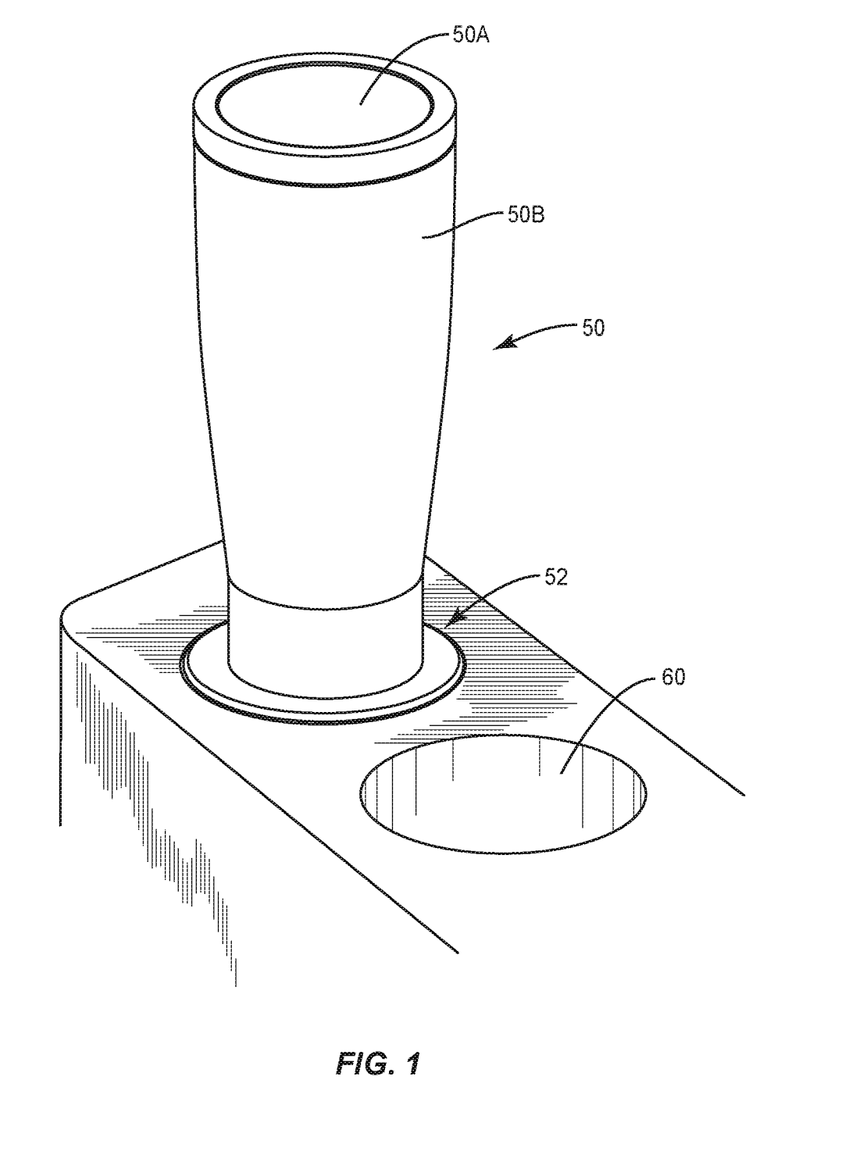
FIG. 1 is a perspective view of the cup holder of the present invention employed in a cup holder cavity for securing a cup.
Figure 2:
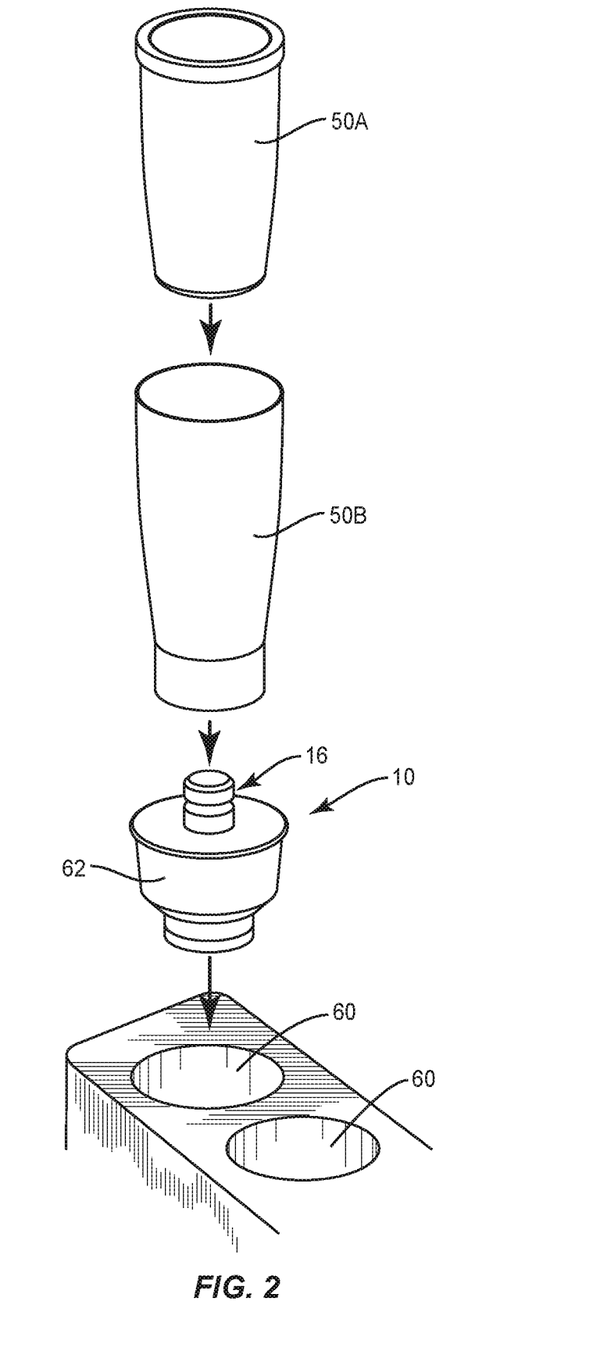
FIG. 2 is an exploded view of the assembly shown in FIG. 1 illustrating the cup holder, cup holder cavity, outer housing of the cup, as well as the interior cup insert.
Figure 3:
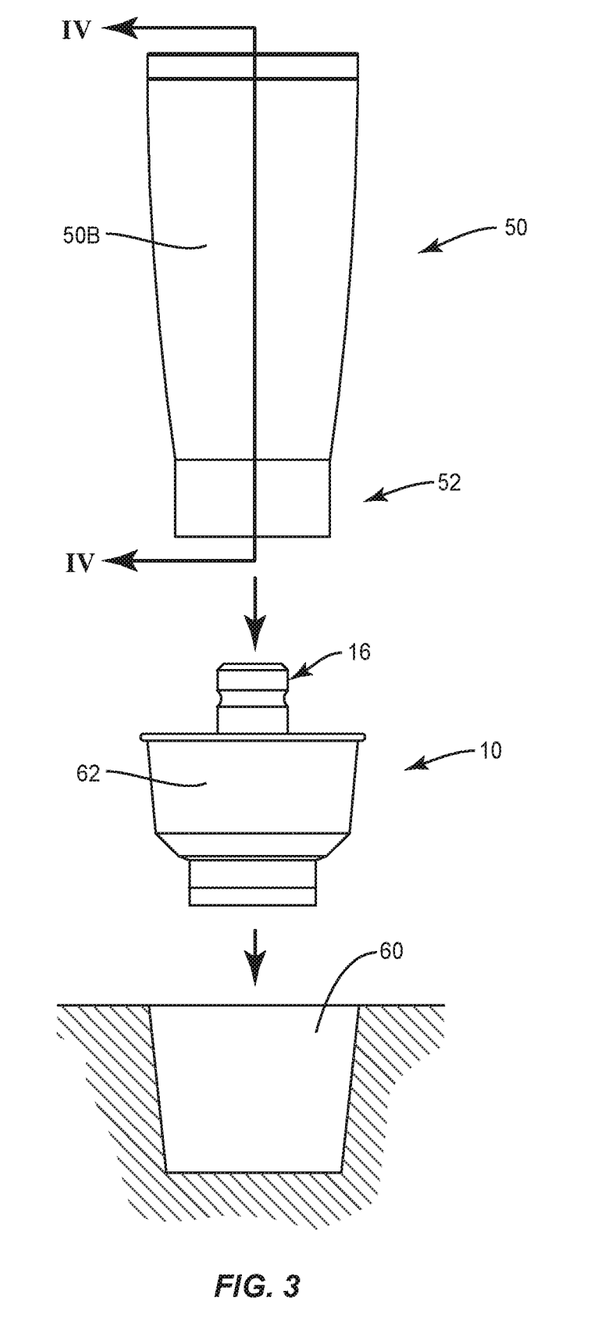
FIG. 3 is a side elevational view showing in exploded form the cup holder cavity, cup holder, and cup.

With further reference to the drawings, the cup holder of the present invention is shown therein and indicated generally by the numeral 10. Before proceeding with a detailed discussion of the cup holder 10, it is pointed out that the cup holder is designed for a number of implementations. In one implementation, the cup holder 10 can be permanently or semi-permanently mounted in original equipment. See FIGS. 10 and 11. For example, the cup holder 10 could be incorporated into the design of a vehicle and actually installed during the course of manufacturing the vehicle. Another implementation described below is where the cup holder is designed to fit into a conventional cup holder cavity which is typically found in automobiles. See FIGS. 1-3. These are just two implementations but people skilled in the art will appreciate that there are many others.

Figure 6:
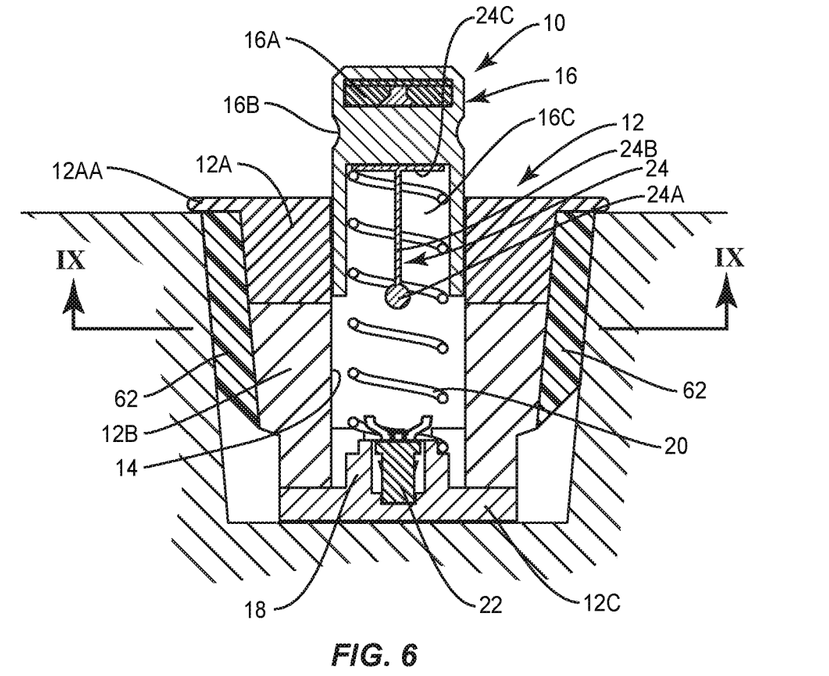
FIG. 6 is a side sectional view showing the cup holder being adapted to fit in a cup holder cavity and showing the coupling of the cup holder in an extended position.

Turning to the cup holder 10, the cup holder includes a housing indicated generally by the numeral 12. Housing 12 can be constructed of plastic, metal or any other suitable material. In the embodiment illustrated, the housing 12 comprises multi-sections. However, various other designs for the housing could be employed, including a unitary housing. As shown in FIG. 6, the housing 12 comprises an upper section 12A, an intermediate section 12B, and a bottom section 12C. These sections are secured together by glue, fasteners or other suitable fastening means.

An opening 14 extends centrally through the top section 12A and intermediate section 12B. A coupling indicated generally by the numeral 16 is reciprocally mounted in the opening 14. As described below, coupling 16 is designed to move between a retracted position shown in FIG. 7, and an extended position shown in FIG. 6. As will be discussed in more detail below, when the coupling 16 is disposed in the extended position, it can be locked in place and inserted into a receptor associated with a cup.

Coupling 16 includes a magnet 16A embedded in an upper portion thereof. See FIG. 6. Just below the magnet 16A is an annular recess 16B. As will be discussed below, the annual recess 16B is employed to secure the coupling 16 into the receptor. Formed in the bottom portion of the coupling 16 is a cylindrical cavity 16C. The wall of the cavity 16C engages the walls of the upper section 12A and intermediate section 12B as the coupling 16 moves up and down in opening 14.

Figure 7:
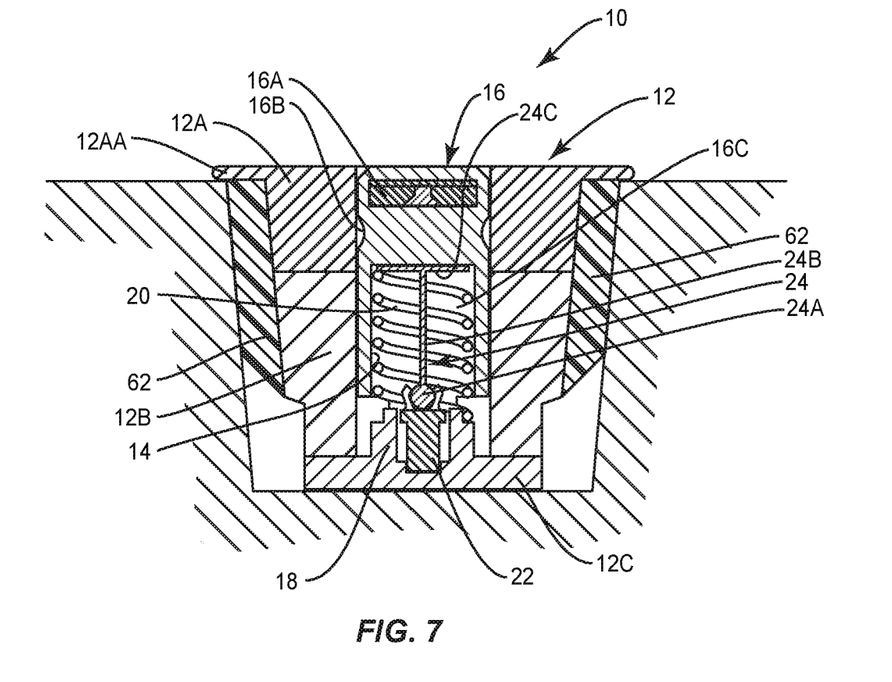
FIG. 7 is a view similar to FIG. 6, but showing the coupling in a retracted position.

With further reference to the drawings, the bottom section 12C of the housing includes a raised center section 18. See, for example, FIGS. 6 and 7. A void is formed in the central part of the center section 18. A coil spring 20 is interposed between the center section 18 and the coupling 16. In particular, the spring 20 extends into the cavity 16C of the coupling. Further, as seen in FIGS. 6 and 7, the lower portion of the spring 20 rests on the center section 18. Hence, spring 20 biases the coupling 18 towards the extended position shown in FIG. 6. However, as discussed below, the spring 20 can be compressed and the coupling 16 can be anchored in the retracted position shown in FIG. 7.

When not secured to a receptor, coupling 16 is held in the retracted position. There is provided a retainer for holding and maintaining the coupling 16 in the retracted position. In one embodiment, the retainer is in the form of a press-to-release latch 22 of the type that is typically found in cabinetry. The press-to-release latch 22 is secured in the bottom section 12C of the housing. Securement can be achieved by various means. In one example, the press-to-release latch 22 is glued to the bottom section 12C as shown in FIG. 6. Forming a part of the retainer in this embodiment is a locking pin 24. See FIGS. 6 and 7. Locking pin 24 includes a ball 24A that is supported on an arm 24B that extends downwardly from a mounting plate 24C. Mounting plate 24C is secured by glue or other suitable means to the upper wall of the cavity 16C formed in the coupling 16.

In order to secure the coupling 16 in the retracted position, the coupling 16 in an unlocked configuration is engaged and pressed downwardly. Pressing downwardly on the coupling 16 compresses spring 20. Coupling 16 is continued to be pressed down until the ball 24A engages the press-to-release latch 22. Further pressing the coupling 16 downwardly results in the latch portion of the press-to-release latch 22 closing around the ball 24A so as to effectively latch the coupling 16 in the retracted position. See FIG. 7. Note in the retracted position that the upper end of the coupling 16 lies generally flush with the surrounding upper surface of the upper section 12A.

To extend the coupling 16 from the retracted position to the extended position, the top of the coupling is engaged and pressed downwardly. The downwardly pressing results in the latch portion of the press-to-release latch 22 opening and freeing the latching pin 24. Spring 20 then pushes the coupling 16 upwardly to the extended position shown in FIG. 6. As discussed below, the coupling in the extended position engages what can be termed a stop, which limits the upward movement of the coupling to the selected extended position shown in FIG. 6.

Figure 8:
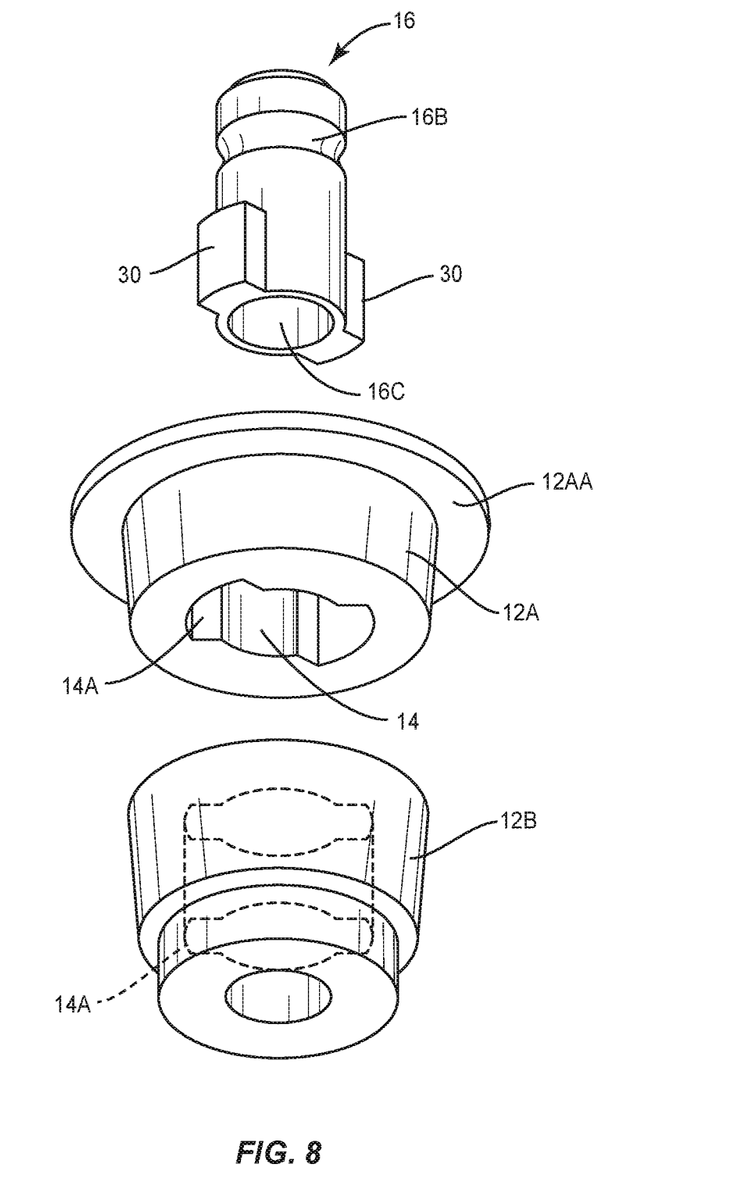
FIG. 8 is an exploded view showing portions of the cup holder including the coupling and two sections of the housing of the cup holder.
Figure 9:
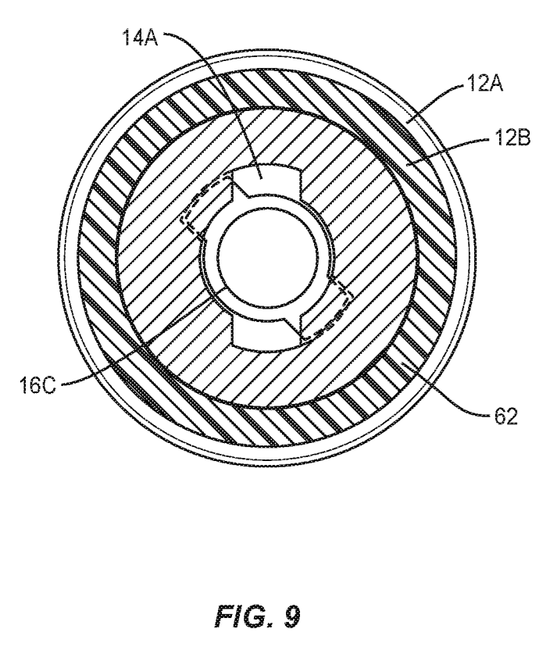
FIG. 9 is a sectional view taken through the line IX-IX in FIG. 6.

Opening 14 formed in the housing 12 has been referred to. Opening 14 forms a space through which the coupling 16 moves when the coupling moves between the retracted and extended position. As seen in FIG. 9, there is provided a keyway 14A that co-exists with the opening 14. Keyway 14 extends through portions of the upper section 12A and through portions of the intermediate section 12B. But the keyway 14A is wider in the upper section 12A than in the intermediate section 12B. This, as discussed below, enables the coupling 16 to be locked in the extended position. As shown in FIG. 8, there is provided a pair of locking nodes 30 disposed on the coupling 16. Locking nodes 30 in this embodiment are spaced opposite each other and extend outwardly from the main body of the coupling. These locking nodes are retained in the keyway 14A. That is, as the coupling 16 moves up and down in the opening 14, the locking nodes 30 slide up and down in the keyway 14A. As noted above, the keyway 14 terminates in the upper section 12A. Hence, when the locking nodes 30 engage the upper terminal end of the keyway 14A, this establishes the fully extended position for the coupling 16. Since the keyway 14A is wider at this point, the coupling 16 can be rotated to where the locking nodes are no longer aligned with the more narrow portion of the keyway 14. This effectively locks the coupling 16 in place and prevents the coupling from moving from the extended position.

To retract the coupling 16, this entails simply rotating the coupling until the locking nodes 30 align with the more narrow portion of the keyway 14. Once this alignment is achieved, the coupling 16 can be pressed downwardly against the force of the spring 20 until the coupling is latched in the retracted position.

Figure 4:
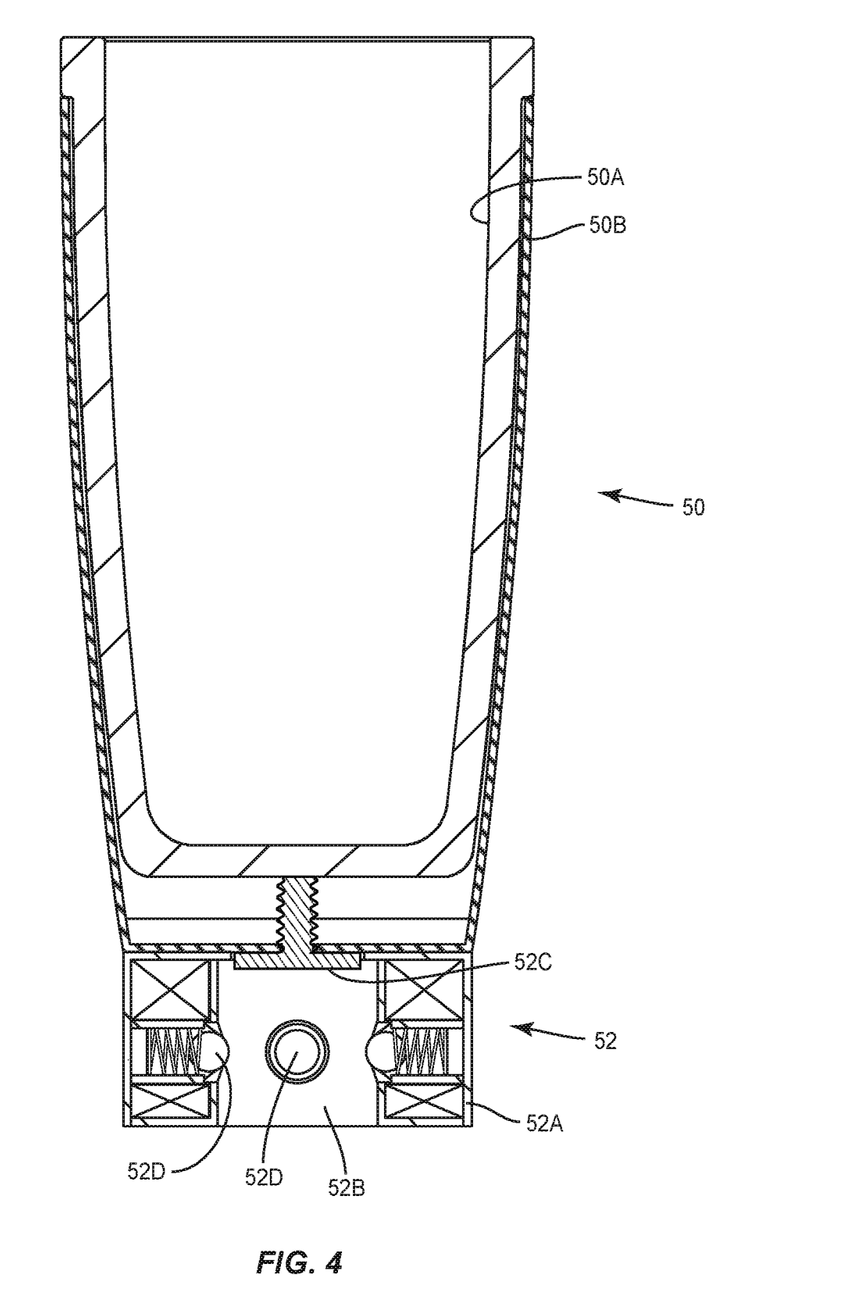
FIG. 4 is a sectional view taken through the line IV-IV of FIG. 3.
Figure 5A:
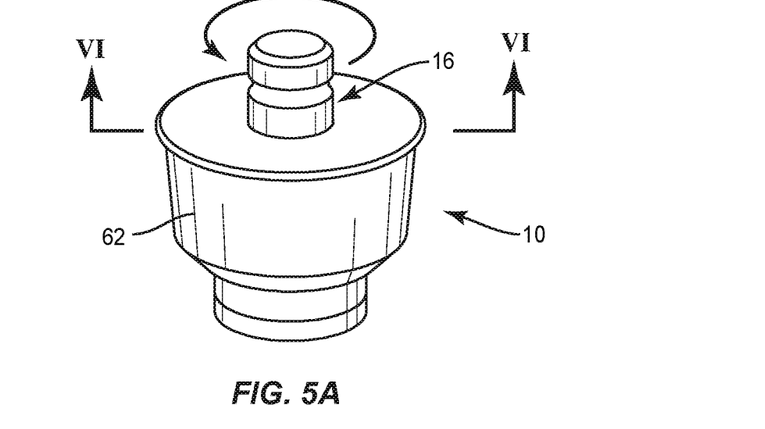
FIG. 5A is a perspective view of the cup holder illustrating a feature where the coupling is rotated to lock the same in the extended position.
Figure 5B:
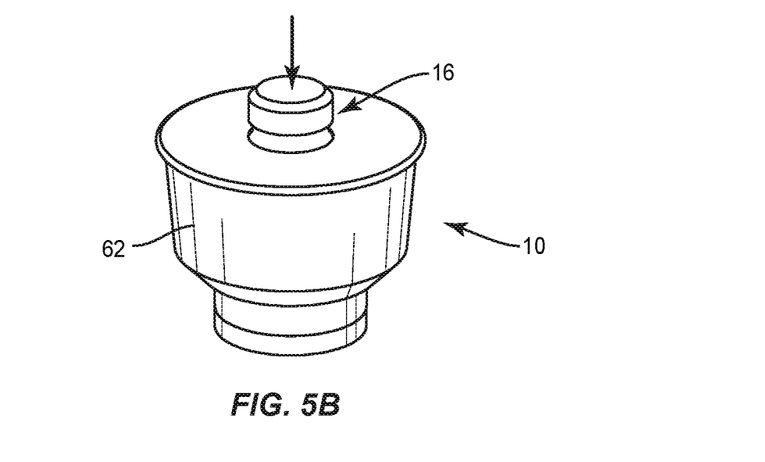
FIG. 5B is a perspective view similar to FIG. 5A but illustrating that the coupling can be pressed down towards the retracted position.
Figure 5C:
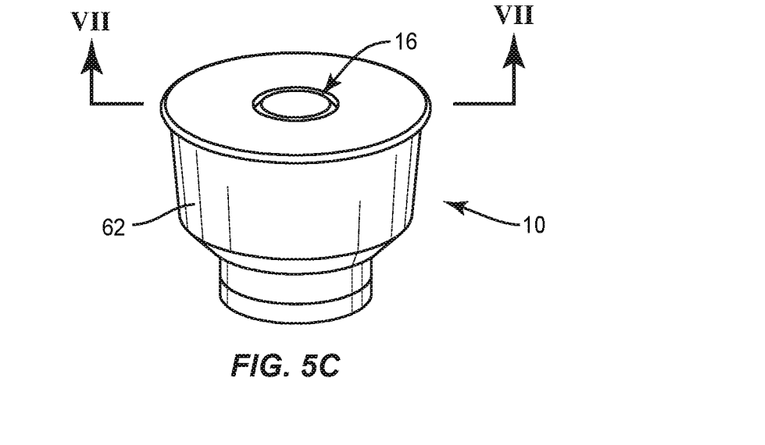
FIG. 5C is a perspective view of the cup holder showing the coupling secured in the retracted position.

Cup holder 10 is designed to couple to a cup and to secure the cup in place. In order to achieve this, coupling 16 is designed to connect to a receptor associated with the cup. Receptor can form a part of the cup or can be a separate piece secured to the cup. Various receptor designs can be employed. One exemplary design is shown in FIG. 4. In this example, a cup is indicated generally by the numeral 50. It includes a microwaveable removable ceramic insert 50A and a stainless steel outer housing or shell 50B. It is appreciated that cup 50 could be constructed of various materials and assume various sizes and shapes. Disposed on the bottom of cup 50 is a receptor indicated generally by the numeral 52. As is illustrated in FIG. 4, the receptor 52 includes an outer wall 52A, a central cavity 52B and a magnet 52C. Magnet 52C is secured to the upper wall of the cavity 52B. In the particular embodiment shown, the magnet is integrated into a screw that is employed to secure the receptor 52 to the cup 50. Also provided in the receptor is a series of circumferentially spaced spring loaded securing balls 52D. These spring loaded balls 52D are biased towards an inner position. They are designed to engage the annular recess 16B formed on an upper portion of the coupling 16. To secure the coupling 16 to the receptor 52, the coupling is disposed in the extended locked position and inserted into the cavity 52B of the receptor 52. The insertion of the coupling 16 results in the balls 52D being engaged and pushed at least slightly outwardly. When the annular recess 16B aligns with the balls 52D, the balls are pushed inwardly and engage the annular recess 16B. This tends to secure the coupling 16 in the cavity 52B of the receptor 52. However, in this embodiment, the design does not rely solely on the spring loaded balls 52D to maintain a secure relationship between the coupling 16 and the receptor 52. Note that the coupling 16 includes an embedded magnet 16A that is attracted to the magnet 52C that is exposed in the receptor 52. Thus, in this example, the coupling 16 is securely held in the receptor 52 by both the spring loaded securing balls 52D and the magnets 52C and 16A.

Figure 10:
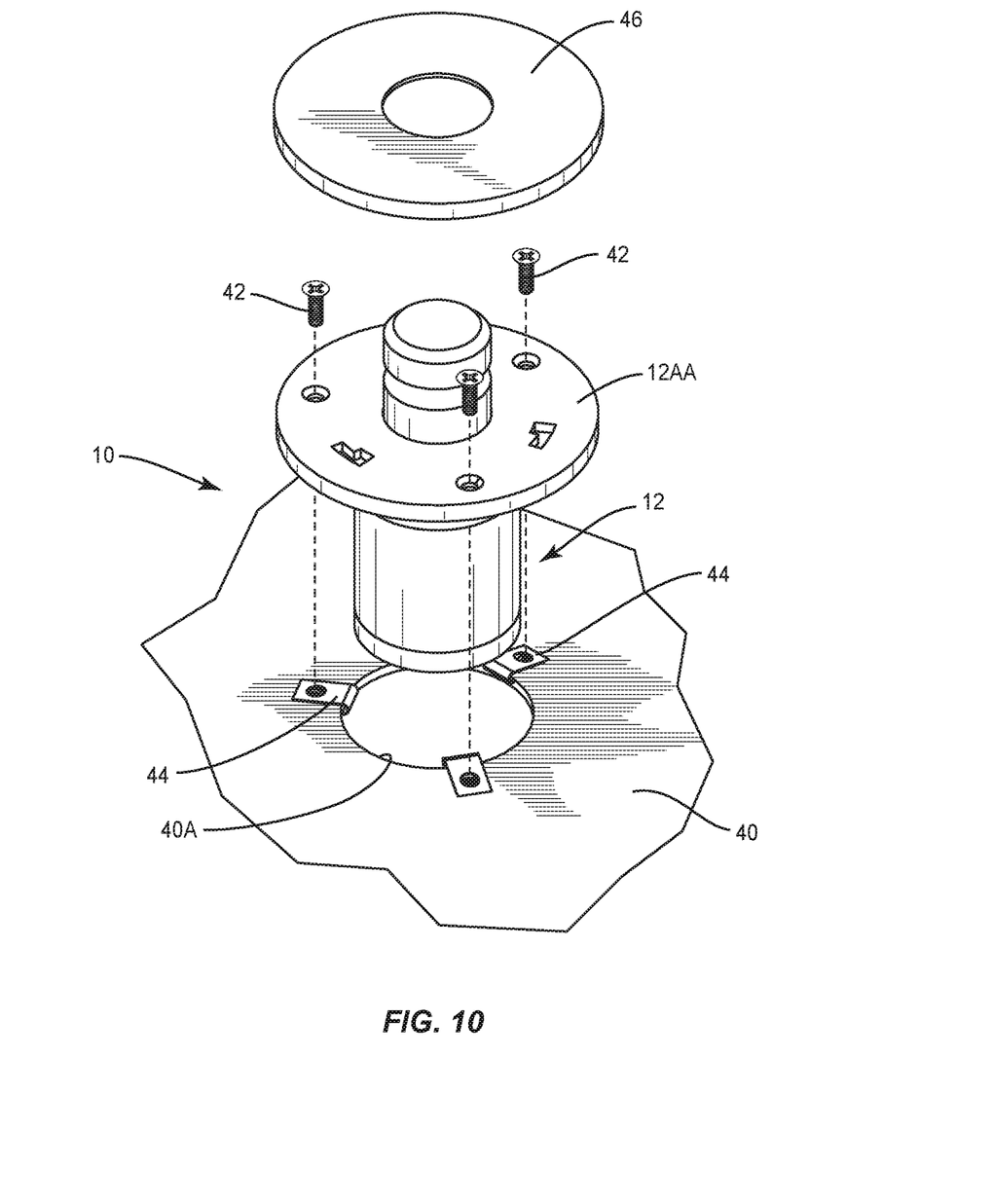
FIG. 10 is a perspective view of the cup holder without the deformable wall and wherein the cup holder design shown herein is configured to be permanently or semi-permanently mounted in a surface.
Figure 11:
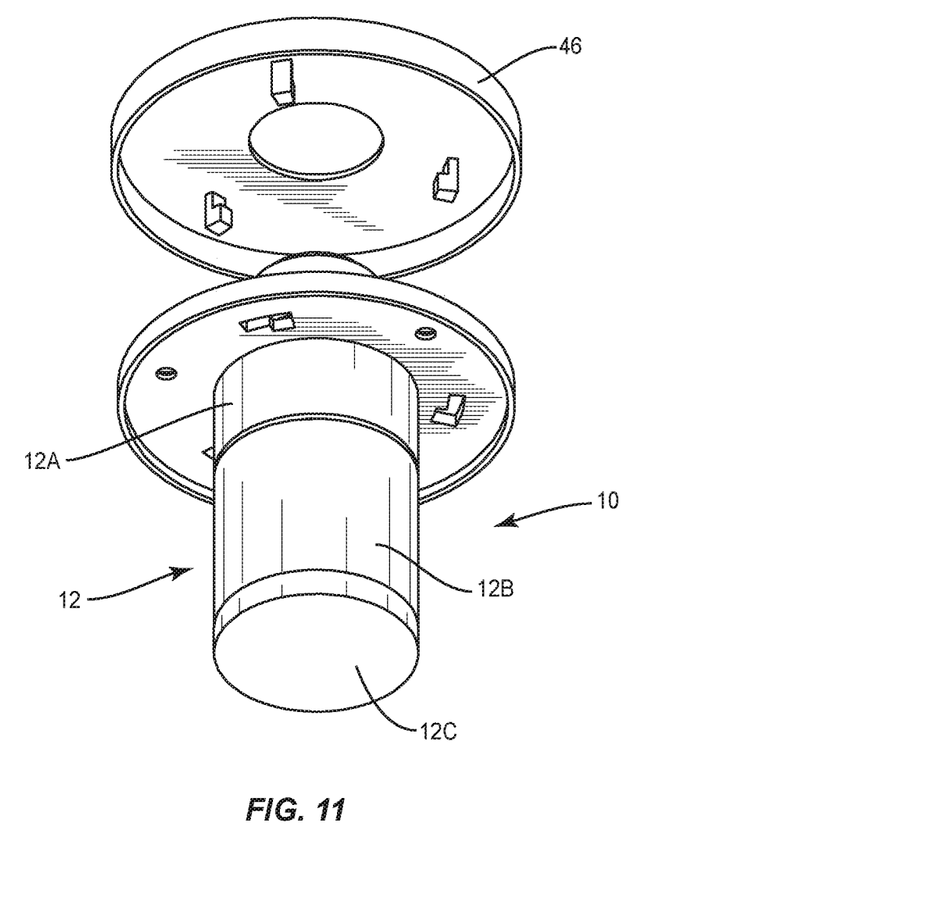
FIG. 11 is a perspective view of the cup holder shown in FIG. 10 and which shows the cup holder from a different angle.

With reference to FIGS. 10 and 11, there is illustrated a standalone cup holder 10. That is, cup holder 10, shown in FIGS. 10 and 11, is not designed to fit into an existing cup holder cavity. Rather, cup holder 10 is designed as a standalone unit designed to be incorporated into original equipment. In FIG. 10, there is shown a surface 40 of a particular object or structure. An opening 40A is provided in the surface 40. The housing 12 of the cup holder 10 is inserted through the opening 40A such that a major portion of the housing 12 is disposed in the underlying structure and below the surface 40. In the embodiment shown in FIG. 10, the upper section of the housing includes a flange 12AA. When the cup holder 10 is inserted through the opening 40A, the flange 12AA engages the surface 40. Hence the cup holder 10 is supported in the underlying object by the flange 12AA engaging the surface 40. A series of screws 42 extend through the flange 12AA and are secured in threaded tabs 42 disposed adjacent the opening 40A. A cover plate 46 having a central opening can be placed over the flange 12AA to provide an aesthetically pleasing appearance.

The standalone mounting illustrated in FIGS. 10 and 11 can be applied to many applications. Surface 40 could be a surface or a console in a vehicle, boat, tractor, ATV, as well as objects that normally do not move. The applications are endless.

As discussed above, the cup holder 10 of the present invention can be adapted to be employed with a conventional cup holder cavity 60. See FIG. 2. To achieve this functionality, the basic cup holder 10 discussed above is slightly modified for use with cup holder cavities. In this regard, a deformable wall or sleeve 62 is secured around the housing 12 of the cup holder. Note in FIGS. 6 and 7 where the deformable wall 62 extends around the housing 12. Deformable wall 62 can be constructed of various suitable materials, such as foam, rubber, etc. The diameter of the deformable wall in the modified version of the cup holder is slightly greater than the largest diameter of the cup holder cavity 60. To secure the modified cup holder in the cup holder cavity 60, the entire assembly is gently pressed into the cup holder cavity 60. This results in the deformable wall 62 slightly constricting to conform to the cup holder cavity 60. When properly inserted in the cup holder cavity 60, the deformable wall 62 exerts a slight outward pressure that maintains the entire cup holder assembly stable in the cup holder cavity 60.

The present invention has many advantages over conventional ways of securing cups and beverage containers during travel and leisure activities. The cup holder of the present invention is clean and efficient, and is designed to provide a sturdy mount for a cup or other type of beverage holder. As discussed above, the cup holder of the present invention can function as a standalone device or can be easily adapted to be used in conjunction with conventional cup holder cavities.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A cup holder for coupling to a cup having a receptor, comprising:
    a housing;
    a retractable coupling moveably mounted in said housing for moving between a retracted position in the housing to an extended position where the coupling projects from the housing;
    a spring disposed in the housing and engaged with the coupling and configured to bias the coupling towards the extended position;
    a retainer for holding the coupling in the retracted position;
    a locking structure associated with the coupling for locking the coupling in the extended position; and
    wherein, in the extended position, the coupling is configured to couple with the receptor of the cup.

2. The cup holder of claim 1 wherein the housing includes multi-sections and a channel extending through the multi-sections of the housing for receiving the coupling.

3. The cup holder of claim 2 wherein the adaptor includes an outer deformable wall configured to deform and engage a wall of the cup holder cavity.

4. The cup holder of claim 1 wherein the housing is supported within an adaptor configured to fit in a cup holder cavity such that when the adaptor is placed in the cup holder cavity, the coupling can be extended and coupled to the receptor of the cup.

5. The cup holder of claim 4 wherein the adaptor comprises a compressible material that extends around the housing and is at least slightly deformable in response to the cup holder being inserted into the cup holder cavity.

6. The cup holder of claim 1 wherein the housing includes an upper surface through which the coupling projects when in the extended position, and wherein the coupling includes a top that lies generally flush with the surface when in the retracted position.

7. The cup holder of claim 6 wherein the channel includes a key way and the locking structure includes one or more locking nodes that project outwardly from the coupling and which move through the key way as the coupling moves between the retracted and the extended positions; and wherein the coupling and the nodes are configured to be rotated into a locked position where the locking node engages a stop which locks the coupling in place and prevents the coupling from retracting into the housing.

8. The cup holder of claim 1 wherein the cup holder forms a part of the kit that includes the cup holder and a cup having the cup receptor disposed on a bottom portion thereof.

9. The cup holder of claim 1 wherein the housing includes a channel and wherein the coupling is moveably mounted in the channel which guides the coupling as the coupling moves between the retracted position and the extended position.

10. The cup holder of claim 1 wherein the retainer for holding the coupling in the retracted position comprises a latch pin associated with the coupling and which moves with the coupling as the coupling moves between the extended and retracted positions, and a latch pin receiver mounted in the housing for receiving the latch pin and securing the coupling in the retracted position.

11. The cup holder of claim 1 wherein the coupling includes an annular recess about an upper portion thereof configured to engage a series of retaining walls in the receptor.

12. The cup holder of claim 1 wherein the coupling includes a magnet in an upper portion thereof for facilitating a connection between the coupling and the receptor.

13. The cup holder of claim 1 wherein the housing includes a channel that receives the coupling and guides the coupling as the coupling moves between the extended and retracted positions; and wherein the coupling is rotatively mounted in the channel and rotatable between a locked and an unlocked position wherein in the locked position the coupling is prevented from retracting into the housing.

14. The cup holder of claim 12 wherein the housing includes an upper surface and wherein the cup holder is permanently or semi-permanently mounted in a structure.

15. A method of employing a cup holder to secure a cup containing a liquid, comprising:
 a. releasing a coupling from a retracted position in a housing that forms a part of the cup holder;
 b. extending the coupling from the retracted position to an extended position where the coupling projects from an upper surface of the housing;
 c. locking the coupling in the extended position and preventing the coupling from moving towards the retracted position;
 d. inserting the coupling into a receptor associated with the cup; and
 e. securing the coupling in the receptor such that the cup and receptor are securely held and stationed by the coupling.

16. The method of claim 15 wherein the coupling is moveably mounted in a channel in the housing and moveable therein between the retracted position and the extended position; and
 wherein the method includes locking the coupling in the extended position by twisting the coupling into a locked position.

17. The method of claim 15 including magnetically connecting the coupling to the receptor associated with the cup.

18. The method of claim 15 including mechanically connecting the coupling to the receptor associated with the cup.

19. The method of claim 15 further comprising:
 latching the coupling in the retracted position;
 unlatching the coupling;
 engaging the coupling with a spring and moving the coupling from the retracted position to the extended position; and
 twisting the coupling into a locked position to prevent the coupling from moving towards the retracted position.

20. The method of claim 15 further including inserting the cup holder into a cup holder cavity.

21. The method of claim 20 wherein there is provided a deformable wall around at least a portion of the housing and the method includes deforming the wall in a course of inserting the cup holder into the cup holder cavity.

22. The method of claim 20 wherein the deformable wall conforms to a size of the cup holder cavity so as to securely retain the cup holder in the cup holder cavity.

* * * * *